S. KUNO.
LID HOLDER AND HAND SHIELD FOR COFFEEPOTS AND THE LIKE.
APPLICATION FILED OCT. 29, 1921.
1,402,517. Patented Jan. 3, 1922.
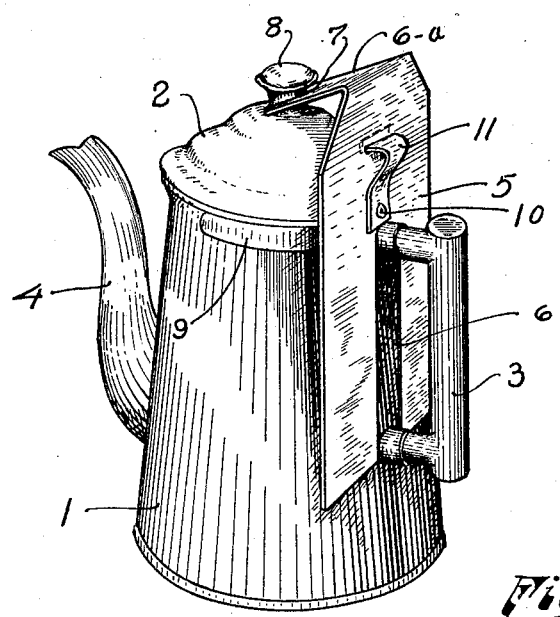
Fig. 1.
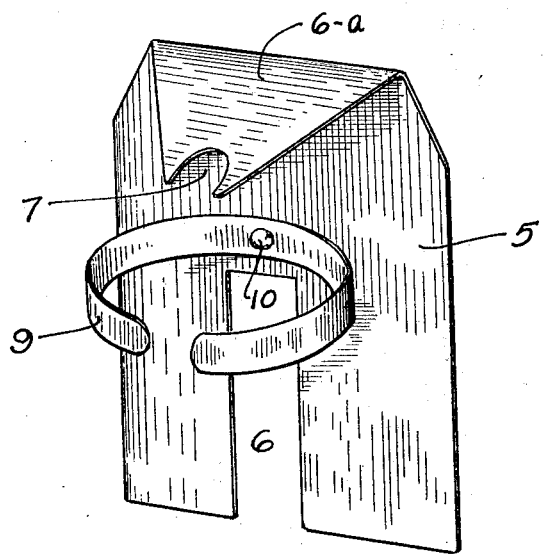
Fig. 2.
Inventor
Shichigoro Kuno.
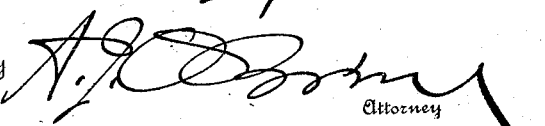
By
Attorney

UNITED STATES PATENT OFFICE.

SHICHIGORO KUNO, OF SUBLET, WYOMING.

LID HOLDER AND HAND SHIELD FOR COFFEEPOTS AND THE LIKE.

1,402,517.     Specification of Letters Patent.     Patented Jan. 3, 1922.

Application filed October 29, 1921. Serial No. 511,284.

*To all whom it may concern:*

Be it known that I, SHICHIGORO KUNO, a subject of the Emperor of Japan, residing at Sublet, County of Lincoln, and State of Wyoming, have invented certain new and useful Improvements in Lid Holders and Hand Shields for Coffeepots and the like; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a means to be removably attached to a coffee pot or similar article, for the purpose of shielding the hand from the heat or steam, and for preventing the opening of the cover.

In places where meals are being prepared for a large number of people, the coffee and tea are prepared in pots of considerable size, and it often happens that the steam from the boiling coffee as it escapes from between the walls of the pot and the cover strikes against the hand of the person who is holding the pot and causes considerable pain and discomfort. It also happens that, as the contents of the pot becomes almost exhausted and necessitates the tipping of the pot at a considerable angle, the cover will open, resulting in the spilling of part of the contents.

It is the object of this invention to provide a shield that can be readily attached to and removed from a coffee pot, and which, when in place, will effectively shield the hand of the operator from any steam that may escape from around the edge of the cover, and at the same time provide a positive and effective means for holding the cover in place as the pot is tipped for pouring.

In order to more clearly describe my invention, I shall have reference to the accompanying drawing, in which Fig. 1 shows a coffee pot of ordinary construction with my protective shield in place thereon; and Fig. 2 shows a perspective view of my shield by itself.

The same reference numbers indicate the same parts throughout the several views.

Numeral 1 indicates a coffee pot having a cover 2, handle 3 and pouring spout 4. My shield comprises a plate 5 having a slot 6 which is adapted to receive the outwardly projecting handle 3 in the manner shown in Fig. 1. The upper end of plate 5 has a portion 6ᴬ bent at an angle thereto and provided with a forked end 7 which is adapted to engage the knob 8 in the manner shown. In order to hold the shield in place on the pot, I provide a spring 9 which has its central portion secured to the shield member 5 by rivets 10, or by any other suitable means. The curved arms of spring 9 engage the top of the pot and hold the shield in place. In order to more securely hold the shield and to positively prevent the opening of the cover while pouring the coffee, I provide the shield with a projecting part 11 which serves as a thumb-piece whereby the operator may hold the shield and prevent it from moving.

The operation of my shield is obvious from the description given above, and I shall therefore not attempt to describe it further.

From the above, it is evident that I have provided a simple, convenient and effective means that can be readily applied to a coffee pot or similar article for the purpose of shielding the hand of the operator from the escaping steam, and also for securely holding the cover in place.

Having now described my invention, what I claim is—

1. In combination with a coffee pot having a hinged cover and a handle, a shield between said handle and the pot, means attached to the shield and engaging the cover for holding the latter in place, and resilient means attached to the shield and engaging the sides of the pot.

2. In combination with a coffee pot having a cover, a pouring spout and a handle, a shield between the handle and the pot, and means attached to the shield and cooperating with the cover for holding the latter in its closed position.

3. A shield comprising a substantially flat sheet having a longitudinal slot, a bent portion integral therewith, and a resilient member attached to one side thereof.

4. A shield adapted to be removably applied to a coffee pot comprising a substantially flat shield member having a slot adapted to receive the handle of the coffee pot and having its upper end bent at an angle to the main body of the shield and adapted to engage the cover, and resilient means adapted to engage the sides of the coffee pot.

5. A shield adapted to be removably applied to a coffee pot having a handle, a pouring spout and a cover, said shield consisting of a thin sheet of metal of rectangular shape, a slot opening at the lower edge of said sheet and adapted to receive the handle of the pot; the upper end of said sheet having a portion bent at an angle thereto and adapted to engage the cover of the pot, an arcuate spring attached to the shield and adapted to engage the sides of the pot.

In testimony whereof I affix my signature.

SHICHIGORO KUNO.